(12) United States Patent
Lyle et al.

(10) Patent No.: US 7,269,199 B2
(45) Date of Patent: Sep. 11, 2007

(54) APPARATUS AND METHOD EMPLOYING DYNAMIC HOP SEQUENCE ADJUSTMENT IN FHSS NETWORKS

(75) Inventors: Ruthie D. Lyle, Durham, NC (US); Jamel Pleasant Lynch, Jr., Carrboro, NC (US); McGill Quinn, Durham, NC (US); William Vigilante, Jr., Scranton, PA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 846 days.

(21) Appl. No.: 10/650,385

(22) Filed: Aug. 28, 2003

(65) Prior Publication Data

US 2005/0058181 A1 Mar. 17, 2005

(51) Int. Cl.
*H04B 1/00* (2006.01)
*H04B 15/00* (2006.01)

(52) U.S. Cl. ............... 375/133; 375/135; 375/136; 455/63.1

(58) Field of Classification Search ........... 375/132, 375/133, 135, 134, 136, 137; 455/63.1, 67.11
See application file for complete search history.

(56) References Cited

U.S. PATENT DOCUMENTS

| | | | |
|---|---|---|---|
| 6,327,300 B1 | 12/2001 | Souissi et al. | |
| 6,396,457 B1 | 5/2002 | Gatherer et al. | |
| 6,643,278 B1* | 11/2003 | Panasik et al. | 370/330 |
| 6,941,110 B2* | 9/2005 | Kloper et al. | 455/67.11 |
| 7,079,812 B2* | 7/2006 | Miller et al. | 455/63.1 |
| 2001/0029166 A1 | 10/2001 | Rune et al. | |
| 2002/0021746 A1 | 2/2002 | Schmidt et al. | |
| 2002/0061031 A1 | 5/2002 | Sugar et al. | |
| 2002/0065058 A1 | 5/2002 | Gatherer et al. | |
| 2002/0075941 A1 | 6/2002 | Souissi et al. | |
| 2002/0085719 A1 | 7/2002 | Crosbie | |
| 2002/0086678 A1 | 7/2002 | Salokannel et al. | |

FOREIGN PATENT DOCUMENTS

| | | |
|---|---|---|
| EP | 1223715 A1 | 7/2002 |
| JP | 10-013380 | 1/1998 |
| JP | 10-261980 | 9/1998 |

OTHER PUBLICATIONS

Bluetooth Specification Version 1.08; 11 Hop Selection, Bluetooth, pp. 127-134, Nov. 29, 1999.

* cited by examiner

*Primary Examiner*—David B. Lugo
(74) *Attorney, Agent, or Firm*—Michael J. Medley; Driggs, Hogg & Fry Co., LPA

(57) ABSTRACT

A frequency hopping spread spectrum apparatus and method is disclosed which mitigates interference from adjacent frequency hopping spread spectrum devices. The apparatus and method are adapted to detect the information related to the hop sequence of an adjacent interfering network device and alter its own hop sequence based on the information relating to the interfering hop sequence.

35 Claims, 3 Drawing Sheets

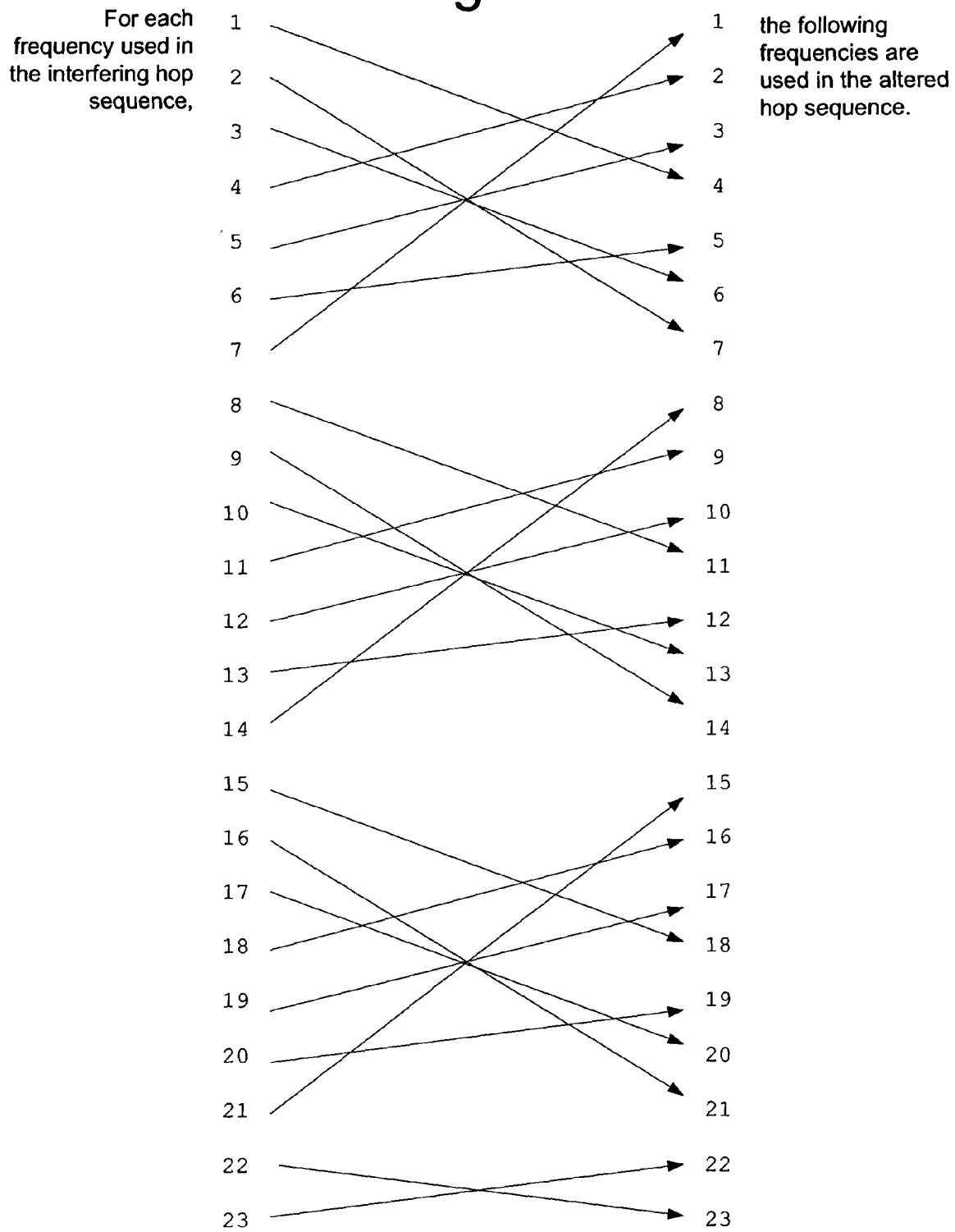

APPARATUS AND METHOD EMPLOYING DYNAMIC HOP SEQUENCE ADJUSTMENT IN FHSS NETWORKS

BACKGROUND OF THE INVENTION

This invention pertains to apparatus and methods which communicate through frequency hopping spread spectrum (FHSS) networks and, more particularly, to an apparatus having wired or wireless communication capabilities over a frequency hopping spread spectrum network. The apparatus and methods perform a hop sequence alteration based on a neighboring frequency hopping spread spectrum network's hop sequence.

Bluetooth® [1] technology defines a specific wireless frequency hopping spread spectrum communication link operating in the unlicensed ISM band at 2.4 GHz using a frequency hopping tranceiver. It allows real-time voice and data communications between Bluetooth® devices. The communication range of Bluetooth® devices is between 10 and 100 meters, but more commonly is limited to between 10 and 20 meters due to channel noise and power limitations of typical devices. At the present time, the communication bandwidth of Bluetooth® devices is limited to 1 Mbps.

A "physical channel" or "channel" is defined in the Bluetooth® specification as a synchronized sequence of randomized hops between various of 79 or 23 RF channels. Each RF channel occupies 1 Mhz of bandwidth in the 2400-2483.5 MHz RF range. Whether the channel comprises 79 or 23 RF channels is predetermined and depends on the country in which the devices operate.

Bluetooth® devices within communicating range can set up ad-hoc networks by sharing a common physical channel and thereby forming what is known as a "piconet." A piconet consists of one and only one master device which controls the piconet and a maximum of 7 slave devices. Typically, the master communicates to the slave in a 625 μs time-slot and the slave replies to the master in the very next time-slot. This technique is known as Time Division Duplexing (TDD). The two consecutive slots are referred to as a frame. Each frame can be thought of as a call and response between the master device and the corresponding slave device.

Piconets are formed in an ad hoc fashion by having all devices continuously scan for inquiries in the area where they are operating. Any device, at any time, can initiate an inquiry. The device that initiates the inquiry takes on the role of the master device in the piconet. Devices in the range of the master's inquiry reply to the inquiry. These replying devices assume the role of a slave device in the piconet. All devices can have the capacity to fulfill both the master role and the slave role. The distinction between master and slave allows easier synchronization over the frequency hopping spread spectrum communications link. All slaves synchronize to the master and the master sets the frequency hopping sequence.

A Bluetooth® device can participate in more than one piconet by applying time multiplexing. To participate on a selected one of several channels/piconets, the device uses the associated master device address and the master clock value of the selected channel, and locally applies a proper time shift to obtain the correct phasing therefore.

A Bluetooth® unit can act as a slave in several piconets, but only as a master in a single piconet. Thus, what might be considered as two separate piconets having a common master would, by definition, be synchronized and would use the same hopping sequence and would therefore actually constitute one and the same piconet.

A limited number of overlapping piconets can autonomously operate because of Bluetooth's frequency-hopping mechanism in which each piconet uses a different pseudo-random frequency hopping sequence wherein each pseudo-random sequence is seeded by the master's device address and is therefore a unique sequence. However, collisions are inevitable. Moreover, as the number of overlapping piconets are increased, collisions become increasingly likely and are problematic.

The IDC forecasts that by 2004 roughly 103.1 million Bluetooth® devices will be enabled in the U.S. and 451.9 million devices world wide. Consequently, the probability of interference resulting from neighboring piconets become increasingly probable. In the event of co-channel and adjacent interference, collisions occur which cause data packet retransmissions. The collisions and retransmissions result in a undesirable reduction in the data rate. Depending on the number, range, and comparable signal strength of neighboring piconets mitigating this interference is important. In many applications, such as voice over IP, even the smallest degradation in the signal is highly undesirable because it degrades the quality of the signal to an unusable degree. Moreover, in a typical office environment, the simultaneous operation of multiple Bluetooth® piconets will crowd the spectrum and increase the probability of signal degradation due to increased collision frequency.

SUMMARY OF THE INVENTION

A novel technology is introduced herein which addresses the aforementioned problems and which is applicable to frequency hopping spread spectrum devices and methods in general and more specifically to both current and future Bluetooth® devices and methods. The invention includes dynamically adjusting the hop sequence of a piconet based upon the hop sequence of neighboring piconets to mitigate interference. This invention addresses both single and multislot interference.

Embodiments of the invention include embodiments as an apparatus and a method for performing the functions programmed or hardwired to execute in the apparatus herein described. The apparatus includes a processor, a memory, an interference detector, and a hop sequencer. The interference detector detects interference from an interfering network and determines the characteristics of the interfering network. The characteristics can include the hop sequence of the interfering network or data relating thereto. The hop sequencer controls the hop sequence of the device and alters the hop sequence of a second frequency hopping spread spectrum network based upon the characteristics of the interfering network.

In one embodiment, logic is included which provides the capability to join the interfering network to obtain the characteristics which relate to the interfering network. Logic is also included to rejoin the original network such that the characteristics of the interfering network are made available on the original network. Optionally, the interfering network characteristics can be transferred over the original network.

BRIEF DESCRIPTION OF THE DRAWINGS

Some of the purposes of the invention having been stated, others will appear as the description proceeds, when taken in connection with the accompanying drawings, in which:

FIG. 4 depicts a mapping in accordance with an embodiment of the present invention between hop frequencies used in an interfering network and the hop frequencies used in another network.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Although the illustrative embodiments will be described as modifications to existing Bluetooth devices and methods, the invention here described is applicable to frequency hopping spread spectrum devices and methods in general. For the most part, details concerning frequency hopping spread spectrum networks in general, and Bluetooth networks in particular, have been omitted in as much as such details are not necessary to obtain a complete understanding of the present invention and are within the skills of persons of ordinary skill in the relevant art. Details concerning Bluetooth networks can be obtained from Volume I of the Bluetooth Core Specification which is available through the Bluetooth SIG, Inc. The core specification is entitled *Specification of the Bluetooth System*. At the time of this writing, version 1.0 B dated Dec. 1, 1999 had been listed as the current version.

The ease and reliability in which various devices are able to wirelessly communicate over Bluetooth Piconets has led to a proliferation of these devices since its inception in the early 1990s. Bluetooth's unique protocol, including the ability for devices to instigate communications autonomously in addition to conventional operator control, allows devices of disparate function to interact over a shared network.

Figure 1:
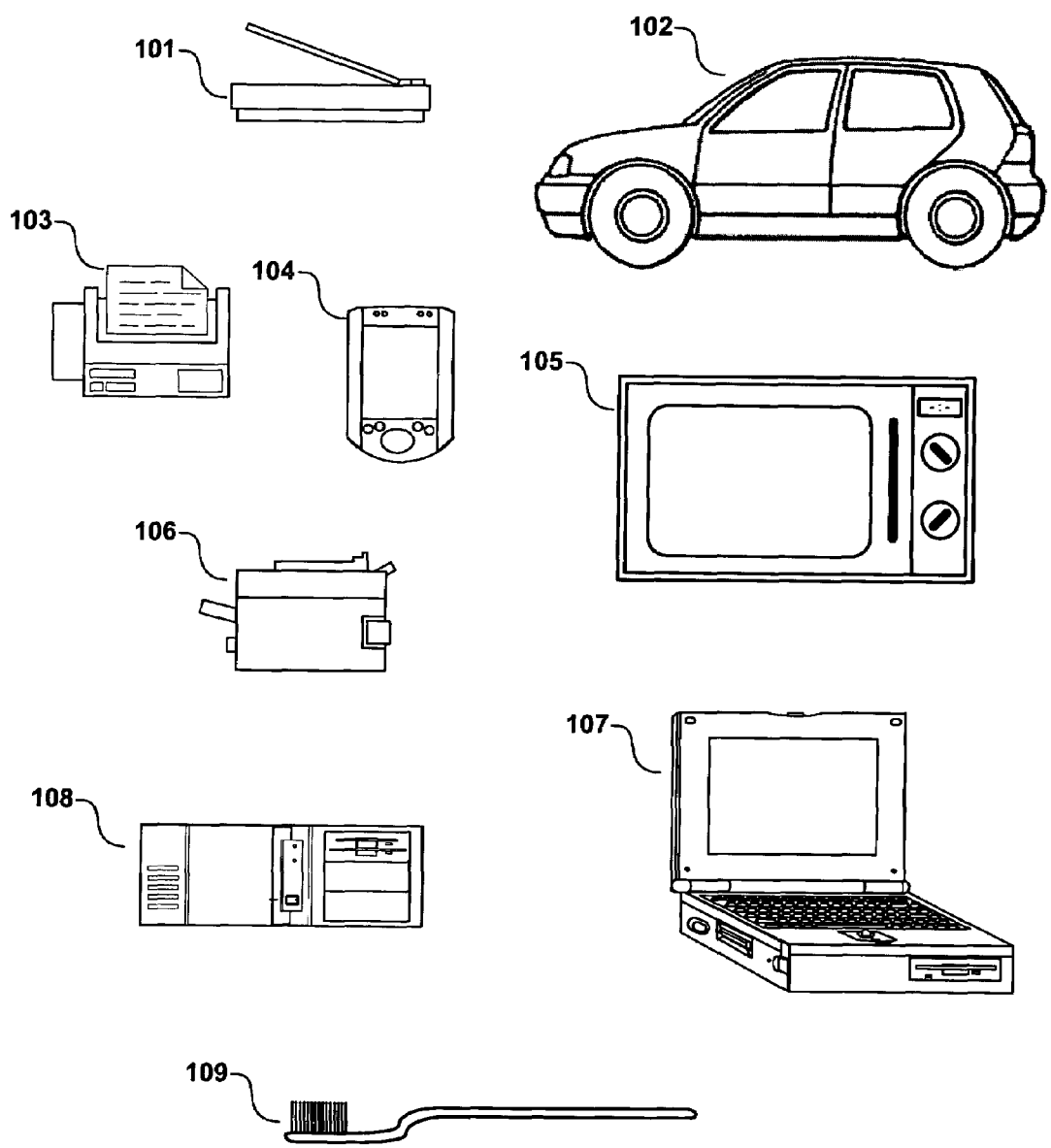
FIG. 1 illustrates a variety of devices configured in accordance with the present invention.

Referring now more particularly to the accompanying drawings, FIG. 1 illustrates a variety of devices configured in accordance with the present invention. There shown are a scanner 101, an automobile 102, a fax machine 103, a PDA 104, a microwave oven 105, a printer 106, a laptop computer 107, a desktop computer 108, and a toothbrush 109. Each of the devices shown comprises logic which performs the functions here described to mitigate inter-piconet interference and are able to communicate with each other, though they provide widely differing functionality. In accordance with the present invention, as will be explained in more detail as the description proceeds, if devices 106, 107, 108 and 109 are operating on a first Piconet and devices 101, 102, 103, 104 and 105 are operating on a second, each of devices on one Piconet or the other are able hop on an altered sequence, as required, should interference be detected from the neighboring Piconet.

Although not shown, it is assumed that each of the embodiments here presented includes a frequency hopping spread spectrum transceiver. Details concerning frequency hopping spread spectrum transceivers are well known in the art and are omitted so as to not obfuscate the present disclosure in unnecessary detail.

Figure 2:
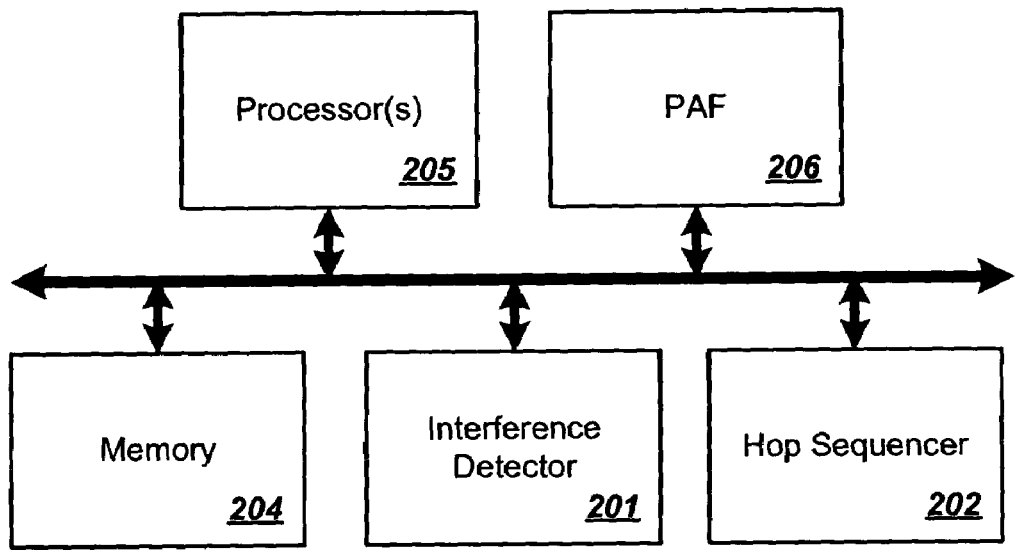
FIG. 2 is a block diagram of a device configured in accordance with an embodiment of the present invention.

FIG. 2 is a block diagram of a device configured in accordance with an embodiment of the present invention. The device can be any of the devices shown in FIG. 1 and the like. The device includes a processor 205 which controls a processor aided function or functions (PAF) 206. PAF 206 varies according to the function of the device and includes the communication of data over the frequency hopping spread spectrum network. For example, for scanner 101, the PAF 206 can include the functions for contolling the scanner light source, including its light emission and movement, the functions for communicating the scanned data to a computer requesting the scanned data, and the functions for accepting user input via buttons on the front panel. For automobile 102, the PAF 206 can include the functions for controlling the ignition of fuel, the security system of the automobile, the display of information via the instrument panel, and can include functions for diagnosing or troubleshooting the vehicle. Processor 205 assists with the functions of PAF 206 to varying degrees. For example, processor 205 can be involved with the enablement and/or disablement of any of the PAF's 206 which are self-controlled or are controlled by a self-contained processor within a particular PAF subsystem. The processor can also be involved with very low level PAF detail. In the preferred embodiment, however, processor 205 controls the principal functionality of the device. That is, in scanner 101, processor 205 is involved in the scanning operation; in PDA 104 processor 205 is that processor responsible for displaying information on the display and for accepting touchpad input on a touch sensitive display and operating on such input. In addition, processor 205 can comprise various sub processors, each of which capable of performing lower-level functions and communicating results to other processors.

The device includes a memory 204 which is accessible to the processor 205. Memory 204 stores code which is to be executed on processor 205, and provides routine data storage for the computational needs of processor 205. Memory 204 also functions to temporarily or permanently store data which is to be transferred over the frequency hopping spread spectrum network. Processor 205 normally aids in the communication of the network data stored in memory 204 over the frequency hopping spread spectrum network.

The device also includes interference detector 201 and hop sequencer 202 to assist with the local functions of the frequency hopping spread spectrum network. Interference detector 201 and hop sequencer 202 can be coupled directly or can be coupled indirectly via processor 205. The interference detector 201 detects interference from a neighboring piconet. The interference detection itself can be in the form of detecting a degradation in data throughput on the piconet in which the device is currently operating. Alternatively, the interference detection can simply be the detection of a second piconet operating within the same area. Interference detector 201 also determines interfering hop sequence data or characteristics relating to the interfering network. This can be done by obtaining the data through a nearby access point or hub to which the interfering network shares common functionality. However, in the preferred embodiment, the interference detector 201 contains logic which joins the interfering network and thereby obtains and stores the hopping sequence of the interfering network and or data or parameters associated with the hopping sequence of the interfering network. As part of data retained by interference detector 201 which pertains to the interfering network, the device optionally retains a correlated time stamp which correlates the sequence of the interfering network to any other sequence. Alternatively, any other means of correlating the interfering sequence to the sequences of other networks is usable. For example, since the sequences are deterministic, logic on board the device can be implemented such that the correlation can be made. This is accomplished by recording portions of the interfering sequence using, for example, spare processor 205 bandwidth on board the device wherein a simulation can be enacted to reverse engineer and identify the sequence and its state relative to another hop sequence. Logic within interference detector 201 would follow both Piconets simultaneously when making the correlation. In this way a time stamp is not necessarily needed.

The interfering hop sequence data obtained by interference detector 201 can additionally be obtained from another device on the Piconet having a configuration similar to the device herein described, that device having at least an interference detector 201.

Hop sequencer 202 gains access to the interfering hop sequence data relating to the interfering network as obtained by interference detector 201. This access can be direct or indirect as previously described. Hop sequencer 202 contains logic which alters the hop sequence of its own network based upon the interfering hop sequence data determined by the interference detector. As with Bluetooth networks, it is desirable in the preferred embodiment to hop on all 79 channels in the spectrum since maintaining the usage of all 79 channels minimizes the overall chances of experiencing collisions. The altered hop sequence is selected by any heuristic or deterministic method, specific examples of which are given in the embodiments which follow.

Figure 3:
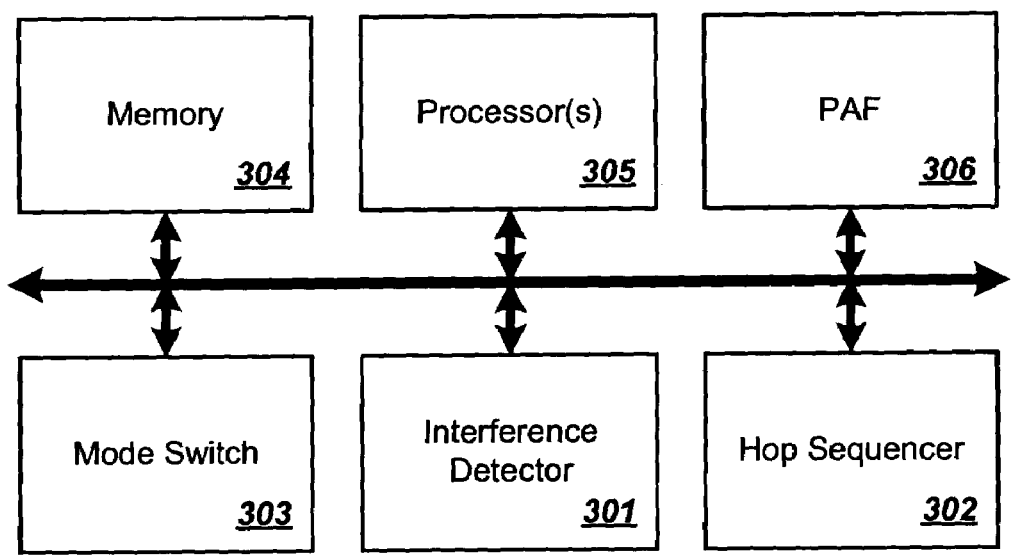
FIG. 3 is a block diagram of a device configured in accordance with an embodiment of the present invention.

FIG. 3 is a block diagram of a device configured in accordance with another embodiment of the present invention. Memory 304, processor 305, and processor aided function or functions (PAF) 306 operate as do the corresponding structures of FIG. 2, specifically memory 204, processor 205, and PAF 206 of FIG. 2. Unless otherwise stated or where details conflict, the embodiment given in FIG. 3 operates in the same manner as described with respect to the embodiment of FIG. 2. In this embodiment, it is also desirable to hop on all available channels since the usage of all available channels provides a more robust connection. Where the embodiment is implemented as a Bluetooth network, the entire set of RF channels available is either 79 or 23. The number of RF channels can change depending on the country in which operation occurs. In some countries the number of RF channels available is 79, in other countries only 23 RF channels are available. In the case that only 23 channels are available in any given country, all 23 channels are used for hopping.

Mode switch 303 contains logic which selects the hopping mode from at least two modes of operation. The first mode is a mode which dictates the hopping sequence for a given network; in the case of a Bluetooth network, this mode is referred to as the master mode. The second mode is a mode which follows the hopping sequence set elsewhere on the network; this second mode is referred to as the slave mode in Bluetooth networks. However, no distinction as to master or slave is given according to the present embodiment since it is foreseeable that masters can become slaves and slaves become masters within a given piconet. Typically, only one device on a network sets the hopping frequency and all other devices follow. However, it is possible to allow different devices on the network to take over the task of setting the hopping sequence for the network. This capability allows a master to become a slave on the current network in order to become a master on another network or to otherwise join another network without collapsing the current network.

Mode switch 303 is capable of selecting an operating mode for the device as would be done in the promiscuous mode of a Bluetooth piconet session. However the coupling between processor 305 and mode switch 303 allows for processor 305 to initiate a piconet session as would any Bluetooth device.

Interference detector 301 is coupled to processor 305 and performs lower-level network functions here below described. Interface detector 301 operates in accordance to the mode of operation indicated by mode switch 303. The operating mode indicated by mode switch 303 may be accessed directly from mode switch 303 or indirectly from processor 305. Interference detector 301 includes logic which detects interference from a nearby network operating within its range. Interference detector 301 also includes logic to detector otherwise determine the interfering hop sequence of the interfering frequency hopping spread spectrum network. If the frequency hopping spread spectrum network is of the Bluetooth variety, the hopping sequences are deterministic and therefore the only data needed is that data which defines the hopping sequence of the interfering network. Since it is possible for some devices on a network to experience interference while others experience none or little, the device detecting the interference via interference detector 301 is likely to be positioned so as to favorably detect the interfering hop sequence data from the nearby interfering network. Although any one device on a network is able to detect the interference, that one device need not be charged with the responsibility to obtain the interfering hop sequence data; another device can be charged with the responsibility. While not required, in the preferred embodiment, the device which detects interference is also the device which determines the interfering hop sequence data of the interfering network. If the device is to operate in a Bluetooth style network, the preferred method of obtaining the interfering hop sequence data is by joining the interfering network and recording the interfering hop sequence parameters and thereafter rejoining the original network and reporting the interfering hop sequence parameters to the original network. This reportage can be to the master device or in general to the device which is operating in the mode which sets the hopping sequence for the original network as selected by the mode switch 303. However, if it is the master device itself which detects the interference and desires to join the interfering network in order to attain the interfering hop sequence data, then no reportage is necessary over the network since the master device itself retains the interfering hop sequence data in local memory. As mapped to the current Bluetooth technology, the master device is the device which operates in the mode which sets the hopping sequence of the original network as selected by mode switch 303. When the master rejoins the original network, it does so with knowledge of the interfering hop sequence as stored in its own local memory. Whether it is the slave or the master which ventures out and joins the interfering network and comes back and rejoins the original network is arbitrary and is set by mode switch 303. However, in the preferred embodiment, it is the slave mode device or the device operating in the mode which follows the hopping sequence which temporarily leaves the original network and joins the interfering network to obtain the interfering hop sequence data. In the preferred embodiment, slave mode venturing is preferred because a master would have to collapse the network in order to join the interfering network according to current Bluetooth designs. However, other embodiments may be devised in which it is possible for a master to pass the responsibility of maintaining the current network to another device on the network such that a network need not collapse in order for a master to temporarily join another network.

In an alternative embodiment, no original network need exist. A device which is about to instigate a network can first check for the existence of other networks which could interfere with a network which is about to be initiated. The device could join the interfering network, obtain the interfering hop sequence data, and then proceed to instigate an ad-hoc network having knowledge of the interfering network's hop sequence in such a way that the initiated hop sequence tends to not coincide statistically with the interfering network's hop sequence using any of the methods described hereinbelow. In this alternative embodiment, since it is the master device which detects the interference and joins the interfering network, interference detector 301 is set to perform this function when mode switch 303 indicates that the device is to operate in the mode which sets the hopping sequence (master).

Referring again to the embodiment of FIG. 3, hop sequencer 302 includes logic which either dictates the hopping sequence for the network in which it operates, or follows the hopping sequence set by another device on the network as a function of mode switch 303. In either mode, the hop sequencer comprises a pseudo-random number generator or the like to set or follow the pseudo-random hop sequence. Hop sequencer 302 is coupled to processor 305 and performs lower-level network functions here below described. Hop sequencer 302 operates in accordance with the mode of operation indicated by mode switch 303 and the data obtained by interference detector 301. The operating mode indicated by mode switch 303 and the data obtained by interference detector 301 may be accessed directly from mode switch 303 and interference detector 301 or indirectly from processor 305. In addition, hop sequencer 302 includes logic which obtains the interfering hop sequence data of a nearby interfering network by either accepting the interfering hop sequence data over the network—when the data is reported by another device over the network—, or by reading the interfering hop sequence data from local storage—when the data was obtained by the same device and is therefore available locally. The local storage can reside in either the memory 304, hop sequencer 302, or the interference detector 301. Alternatively, the local storage can reside in a register anywhere within the device or within any memory accessible from the device of the present embodiment.

Hop sequencer 302 additionally includes logic which alters its dictated hop sequence while operating in the mode which dictates the hopping sequence as indicated by the mode switch 303. This however, does not preclude a device which had been operating in the mode which follows the hopping sequence to switch its mode to a mode which dictates the hop sequence as would be the case when a slave detects the interference and rejoins the network. In other embodiments, it is possible that the slave when rejoining the original network negotiates with the existing master and takes over the responsibility of master in the original network. This would be the case when limited processing is available on typical devices and the time required to devise a new hopping sequence is extensive and perhaps beyond the capability of the processor while a device is in full master mode operation. The alteration of the hop sequence is based upon the obtained interfering hop sequence data and is calculated so as to minimize collisions between the two networks. The altered-hop-sequence calculation can be by heuristic methods when enough processing power and memory is available within the device. The processing can be performed either in processor 305 or a sub processor within hop sequencer 302. Alternatively, the altered hop sequence can be calculated by deterministic methods; several examples of which are given hereinbelow. In any case, the altered hop sequence comprises the same number of RF channels as are available. That is, the altered hop sequence contains all 79 or all 23 available RF channels, over the long run, depending on the country in which the device operates.

The heuristic and deterministic methods can involve seeding the pseudo-random number generator with candidate-alternative values and comparing the resulting sequence to the interfering sequence. In all cases, the heuristic and deterministic methods can be either simulated or actually attempted in real time. The heuristic and deterministic methods can also involve using alternate pseudo-random number generator circuits rather than alternate seeding; in this case the circuit to be used for any particular sequence is communicated over the network for all devices on the network. However, alternate seeding is preferred over alternate circuitry/logic because embodiments can be implemented using mostly or entirely existing hardware. On the other hand, when pseudo-random number generator circuits are implemented in software onboard the device, embodiments which utilize alternate circuitry are feasible.

One example of an altered hop sequence using a heuristic method, as calculated by the hop sequencer 302, is to iteratively offset the existing hop sequence by a constant number of slots and determine if the offset altered sequence would produce (or produces) fewer collisions than the existing sequence. If several offset altered sequences are found to produce fewer collisions, the offset altered sequence which is found to produce the fewest collisions is the sequence selected for the alteration. Weights can be assigned such that the decision is made based on whether fewer collisions occur in the short-term or whether fewer occur over the long-term.

Note that the term -offset-, as used herein, differs from its meaning in the Bluetooth® specification. As used in the Bluetooth® specification, -clock offset- and -offset- refer to that number μs which must be added or taken away from a local slave clock to bring it into alignment with a master clock on the same piconet, usually 625 μs or less. Conversely, as used herein, the term -offset- refers to an offset in the pseudo-random sequence of an unassociated piconet which hops on an altogether different sequence, in which case alignment is neither possible nor desired. In embodiments where the sequence is selected to be the sequence of the neighboring piconet, the offset is large (preferably >6 ms) and is in a direction which causes an intentional misalignment of the hop sequences. In other words, where an embodiment utilizes a sequence offset, there is no attempt to align phases with the neighboring piconets; phase alignment, or "clock offset" as referred to in the Bluetooth® specification, still applies to masters and slaves within the piconets of this invention which, in addition, have a sequence offset as disclosed herein. Therefore, as used herein, the term -offset- refers to the relatively larger-scale extra-piconet offset to sequences and not to the microscale intra-piconet phase alignments which still occur.

An example of an altered hop sequence using a deterministic method, as calculated by the hop sequencer 302, is to adopt a variation of the interfering hop sequence which tends to produce fewer collisions than a random sequence. One such method is to introduce a translation to the interfering hop sequence. The resulting altered hop sequence of this example is produced by the method previously described requiring an alternate circuit. Thus, in this example, it is preferable that the pseudo-random number generator circuitry be implemented in software. One such translation is shown in FIG. 4 wherein an example is shown for the 23-hop-sequence systems. For each frequency used in the interfering fop sequence shown on the left hand side of FIG. 4, the frequencies shown on the right hand side of FIG. 4 are used in the altered hop sequence. Such a translator can be built in RAM as a look-up table with address values representing the left column of FIG. 4, and data values representing the translated values on the right. In this manner, a look-up value of 2 would return a translated value of 7. Another such translation is to introduce an offset to the interfering hop sequence. Still another translation is to introduce an even number to odd number translation based on the interfering hop sequence.

The order of steps given herein is for exemplary purposes only and should not be interpreted as limiting with respect to other embodiments which are possible using a different order of steps in implementing the inventive concepts described herein. Any lettering of steps in the method claims are for the purpose of improving clarity and do not imply any particular order of steps to be taken.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
   (a) a processor;
   (b) a memory coupled to said processor which stores code for execution on said processor and which stores network transferrable data therein;
   (c) an interference detector which is coupled to said processor and which detects interference from an interfering network and attains interfering hop sequence data relating to the interfering network, wherein the interfering network is a frequency hopping spread spectrum (FHSS) network in which a predetermined number of FHSS channels are used for frequency hopping, and further wherein the interference detector attains the interfering hop sequence data upon the apparatus joining the interfering network; and
   (d) a hop sequencer which is coupled to said processor and which alters the hop sequence of a second FHSS network upon the apparatus joining the second FHSS network, wherein the hop sequence is altered based upon the interfering hop sequence data;
   wherein the altered hop sequence comprises the same number of channels as the predetermined number of FHSS channels and wherein the network transferrable data stored in said memory is transferrable over the second network.

2. Apparatus of claim 1 wherein the altered hop sequence is a sequence which reduces the frequency of collisions between the interfering network and the second network.

3. Apparatus of claim 2 wherein the altered hop sequence is the hop sequence of the interfering network having a predetermined translation applied thereto.

4. Apparatus of claim 1 wherein the altered hop sequence is an offset altered sequence.

5. Apparatus of claim 4 wherein the offset altered sequence is the hop sequence of the second network having an offset applied thereto.

6. Apparatus of claim 4 wherein the offset altered sequence is the hop sequence of the interfering network having an offset applied thereto.

7. Apparatus of claim 1 wherein said interference detector (c) detects interference as a degradation in network performance on the second network.

8. Apparatus of claim 1 wherein said processor is the processor which controls the principal functionality of said apparatus.

9. Apparatus of claim 8 wherein said processor comprises a plurality of sub-processors which control the various elemental aspects of said apparatus.

10. Apparatus comprising:
    (a) a processor;
    (b) a memory coupled to said processor which stores code for execution on said processor and which stores network transferrable data therein;
    (c) a mode switch coupled to said processor which selects a hop sequence operating mode in a frequency hopping spread spectrum (FHSS) network in which a predetermined number of FHSS channels are used for frequency hopping, wherein the selected mode is one of at least a mode which dictates a hopping sequence and a mode which follows a hopping sequence;
    (d) an interference detector which is coupled to said mode switch and which detects interference from an interfering network and joins the interfering network and determines interfering hop sequence data relating to the interfering network and thereafter joins a second network and based upon the mode selected by said mode switch performs a first predetermined action wherein the first predetermined action is an action selected from the group consisting of
       (i) reporting the interfering hop sequence data over the second network, and
       (ii) saving the interfering hop sequence data in local storage; and
    (e) a hop sequencer which is coupled to said processor and which obtains the interfering hop sequence data by performing a second predetermined action wherein the second predetermined action is an action selected from the group consisting of
       (iii) accepting the interfering hop sequence data over the second network, and
       (iv) reading the interfering hop sequence data from local storage, and which alters its dictated hop sequence while operating in the mode which dictates the hopping sequence based upon the obtained interfering hop sequence data; wherein the altered hop sequence comprises the same number of channels as the predetermined number of FHSS channels and wherein the network transferrable data stored in said memory is transferrable over the second network.

11. Apparatus of claim 10 wherein the altered hop sequence is a sequence which reduces the frequency of collisions between the first and second networks.

12. Apparatus of claim 11 wherein the altered hop sequence is the hop sequence of the interfering network having a predetermined translation applied thereto.

13. Apparatus of claim 10 wherein the altered hop sequence is an offset altered sequence.

14. Apparatus of claim 13 wherein the offset altered sequence is the hop sequence of the second network having an offset applied thereto.

15. Apparatus of claim 13 wherein the offset altered sequence is the hop sequence of the interfering network having an offset applied thereto.

16. Apparatus of claim 10 wherein said interference detector (c) detects interference as a degradation in network performance on the second network.

17. Apparatus of claim 10 wherein said processor is the processor which controls the principal functionality of said apparatus.

18. Apparatus of claim 17 wherein said processor comprises a plurality of sub-processors which control the various elemental aspects of said apparatus.

19. A method comprising the steps of:
(a) detecting interference produced by a first network, wherein the first network is a frequency hopping spread spectrum (FHSS) network in which a predetermined number of FHSS channels are used to perform the frequency hops;
(b) joining the first network to determine interference hop sequence data of the first network;
(c) joining a second FHSS network to report the interference hop sequence data to a master of the second network;
(d) altering the hop sequence of the second network based upon the determined interference hop sequence data;
wherein the altered hop sequence comprises the same number of channels as the predetermined number of FHSS channels, and wherein at least said detecting step (a) is performed by a device having a processor and a memory which stores network transferrable data therein.

20. The method of claim 19 wherein the altered hop sequence is a sequence which reduces the frequency of collisions between the first and second networks.

21. The method of claim 20 wherein the altered hop sequence is a sequence is the hop sequence of the interfering network having a predetermined translation applied thereto.

22. The method of claim 20 wherein the altered hop sequence is an offset altered sequence.

23. The method of claim 19 wherein said detecting step (a) includes detecting a degradation in network performance on the second network.

24. The method of claim 19 wherein a slave device performs the step of joining the second network.

25. The method of claim 19 wherein said altering step (c) is performed by a master device on the second network.

26. A method comprising the steps of:
(a) detecting interference produced by a first network, wherein the first network is a frequency hopping spread spectrum (FHSS) network in which a predetermined number of FHSS channels are used to perform the frequency hops;
(b) joining the first network to determine interference hop sequence data which relates to the first network;
(c) joining a second FHSS network to perform a first predetermined action wherein the first predetermined action is selected from the group consisting of
   (i) an action which reports the interference hop sequence data over the second network, and
   (ii) an action which saves the interference hop sequence data in local storage;
(d) obtaining the interference hop sequence data through a second predetermined action wherein the second predetermined action is selected from the group consisting of
   (iii) an action which accepts the interference hop sequence data over the second network, and
   (iv) an action which reads the interference hop sequence data from local storage; and
(e) altering the hop sequence of the second network based upon the obtained interference hop sequence data;
wherein the altered hop sequence comprises the same number of channels as the predetermined number of FHSS channels, and wherein at least said detecting step (a) is performed by a device having a processor and a memory which stores network transferrable data therein.

27. The method of claim 26 wherein the altered hop sequence is a sequence which reduces the frequency of collisions between the first and second networks.

28. The method of claim 27 wherein the altered hop sequence is the hop sequence of the interfering network having a predetermined translation applied thereto.

29. The method of claim 26 wherein the altered hop sequence is an offset altered sequence.

30. The method of claim 29 wherein the offset altered sequence is the hop sequence of the second network having an offset applied thereto.

31. The method of claim 29 wherein the offset altered sequence is the hop sequence of the interference network having an offset applied thereto.

32. The method of claim 26 wherein said detecting step (a) includes detecting a degradation in network performance on the second network.

33. The method of claim 26 wherein said joining step (b) is performed by a slave device on the second network.

34. The method of claim 26 wherein said altering step (e) is performed by a master device on the second network.

35. The method of claim 26 wherein a slave device on the second network performs said detecting step (a), said joining step (b), and said joining step (c).

* * * * *